United States Patent [19]

Schuermann

[11] Patent Number: 5,396,251
[45] Date of Patent: Mar. 7, 1995

[54] ELECTRONIC TRANSPONDER TUNING PROCEDURE

[75] Inventor: Josef H. Schuermann, Oberhummel, Germany

[73] Assignee: Texas Instruments Deutschland GmbH, Germany

[21] Appl. No.: 991,044

[22] Filed: Dec. 15, 1992

[51] Int. Cl.[6] .............................................. G01S 13/80
[52] U.S. Cl. ............................................ 342/51; 342/42
[58] Field of Search .................... 342/42, 44, 50, 51

[56] References Cited

U.S. PATENT DOCUMENTS

| | | | |
|---|---|---|---|
| 4,724,427 | 2/1988 | Carroll | 342/44 X |
| 4,870,419 | 9/1989 | Baldwin et al. | 342/50 |
| 4,912,471 | 3/1990 | Tyburski et al. | 342/42 |
| 5,025,492 | 6/1991 | Viereck | 342/44 |
| 5,053,774 | 10/1991 | Schuermann et al. | 342/44 |
| 5,164,732 | 11/1992 | Brockelsby et al. | 342/44 |
| 5,270,717 | 12/1993 | Schuermann | 342/42 X |
| 5,287,112 | 2/1994 | Schuermann | 342/42 |
| 5,287,113 | 2/1994 | Meier | 342/51 |
| 5,294,931 | 3/1994 | Meier | 342/44 |

*Primary Examiner*—John B. Sotomayor
*Attorney, Agent, or Firm*—Brian C. McCormack; James C. Kesterson; Richard L. Donaldson

[57] ABSTRACT

A method is disclosed herein for tuning a responder unit (12). The method comprises the steps of storing energy in a responder unit energy accumulator (136) in a contactless fashion by RF energy transmitted from the interrogator unit (10) to the responder unit (12), and exciting within the responder unit (12) an RF carrier wave. The method further comprises the steps of transmitting the RF carrier wave in a first response from the responder unit (12) to the interrogator unit (10) and measuring within the interrogator unit (10) the received signal strength of the RF carrier wave of the first response. In further accordance with the invention tuning data may be transmitted to the responder unit (12) by sending at least one RF programming sequence from the interrogator unit (10) to the responder unit (12). The responder unit (12) upon receiving the RF programming sequence from the interrogator unit (10) would preferably modify an internally stored frequency setting within a memory (244) of the responder unit (12) in response to the first set of data. Other devices, systems and methods are also disclosed.

20 Claims, 2 Drawing Sheets

ELECTRONIC TRANSPONDER TUNING PROCEDURE

CROSS-REFERENCE TO RELATED PATENTS

The following coassigned patent applications are hereby incorporated herein by reference: Ser. No. 07/981,635, pending.

FIELD OF THE INVENTION

This invention generally relates to a transponder arrangement comprising an interrogator unit which transmits at least one RF interrogation pulse to a responder unit which thereupon sends data stored therein back to the interrogator unit in the form of a modulated RF carrier. The interrogator unit of the present invention is further operable to derive tuning data from the responder unit and thereupon may initiate electronic tuning of the responder unit's resonant frequency.

BACKGROUND OF THE INVENTION

There is a great need for devices or apparatuses which make it possible to identify or detect as regards their presence at a predetermined location objects which are provided with such devices or apparatuses in contactless manner and over a certain distance. An additional need exists to be able to change the resonant frequency with which such devices respond to such inquiries. An additional need exists to be able to tune the resonant circuit of the responder unit to match that of the interrogator unit, such as in the case the two units originally were matched in frequency and the resonant frequency of the responder unit has drifted or because of detuning due to environmental effects.

Heretofore, in this field, radio-frequency identification (RF-ID) transponders are permanently tuned to a resonant frequency at the factory. Certain environmental considerations such as presence of a para-magnetic or dia-magnetic material which lowers the inductance of an antenna and tunes it to a higher frequency (e.g. if the transponder is close to copper or aluminum). Other conditions might cause a change in the resonant frequency such as the ambient temperature or aging of the components. In the application of a small wireless transponder, it is desirable for any post-factory tuning to not require bulky electro-mechanical components as mechanically-variable capacitors or mechanically-variable inductors.

SUMMARY OF THE INVENTION

The needs outlined in the background of the invention can be met with the inventive concept disclosed hereinbelow. For universal usability of such an arrangement the interrogation or enquiry unit is preferably handy and compact so that it withstands rough treatment in practice. The responder is preferably very small so that it can readily be attached to, or inserted in, the objects to be detected.

The invention is based on the problem of providing a transponder arrangement with the aid of which the aforementioned requirements can be fulfilled and with which the necessary responder device can be made very economically and very small so that it can be used for a great variety of purposes, in particular whenever many objects are to be provided with the responder unit. The responder unit is to be constructed so that it has a very low energy requirement and does not need its own power source which after a certain time would have to be renewed.

This problem is solved in the transponder arrangement, according to the invention, by providing an energy accumulator within the responder unit by which the energy contained in the RF interrogation pulse is stored. The responder unit in the preferred embodiment provides means to detect the termination of the reception of the RF interrogation pulse and the presence of a predetermined energy amount in the energy accumulator, thereupon triggering the excitation of an RF carrier wave generator operating with the frequency contained in the RF interrogation pulse. Still further means are provided to demodulate, from the RF carrier wave, data which may be used to change or "tune" the frequency with which the RF carrier wave generator operates.

As such a method is disclosed for tuning a responder unit. The method comprises the steps of storing energy in a responder unit energy accumulator in a contactless fashion by RF energy transmitted from said interrogator unit to said responder unit, and exciting within said responder unit an RF carrier wave. The method further comprises the steps of transmitting said RF carrier wave in a first response from said responder unit to said interrogator unit and measuring within said interrogator unit the received signal strength of said RF carrier wave of said first response. In further accordance with the invention tuning data may be transmitted to the responder unit by sending at least one RF programming sequence comprising a first set of data from said interrogator unit to said responder unit. The responder unit upon receiving said RF programming sequence from said interrogator unit would preferably modify an internally stored frequency setting within said responder unit in response to said first set of data.

In an embodiment of the invention a protocol is further provided for monitoring a first response from the responder unit and storing in a memory the strength of the first response. The protocol then provides that the tuning information be sent to the responder unit, and that the responder unit's response using the new frequency derived from the tuning information also be measured for strength of response. A microprocessor might successively perform this operation until a local maximum is found.

Advantageous further developments and purposes will be appreciated by reference to the detailed specification.

DETAILED DESCRIPTION OF PREFERRED EMBODIMENTS

Figure 1:
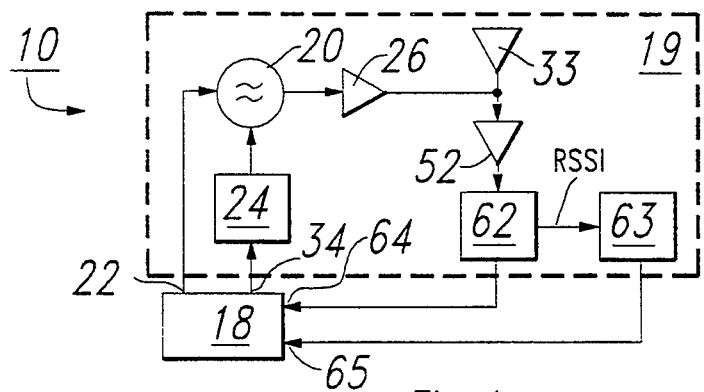
FIG. 1 is a block circuit diagram of the interrogator unit according to the invention.

Referring now to FIG. 1, the interrogation unit 10 contains as central control unit a microprocessor 18 which is responsible for the control of the function sequences. A wireless datacom transceiver 19 under control of microprocessor 18 is responsible for communications with other interrogator units having other wireless datacom transceivers and for communication with responder units 12 (not shown, see FIG. 3). The wireless datacom transceiver 19 comprises an RF oscillator 20 which generates RF oscillations as soon as it has been set in operation by a signal at the output 22 of the microprocessor 18. Further components which are preferably contained within the wireless datacom transceiver 19 include a modulator 24, an output amplifier 26, an antenna 33, an input amplifier 52, and a demodulator 62. Although, preferably, these components are contained in the interrogator unit 12 it may not be necessary for all the components to be used. For example, in another embodiment of the invention the amplifiers 26,52 might not be needed. In such an instance the RF oscillator 20 might be constructed to directly radiate into the transmitting medium without the use a separate antenna 33.

Still referring to FIG. 1, the oscillations of RF oscillator 20 may be modulated by a modulator 24 which is controlled by an output 34 of the microprocessor 18. The output signal of the RF oscillator 20 is supplied by an amplifier 26 to an antenna 33 which transmits the RF interrogation pulse supplied to it by the oscillator 20 and receives the RF signal sent back by the responder unit 12. The RF signals received by the antenna 33 are supplied to an amplifier 52 which amplifies the RF signals. The output of the amplifier 52 is connected to a demodulator 62 which from the signal supplied thereto generates a demodulated data stream which is supplied to the input 64 of the microprocessor 18. In a preferred embodiment, the demodulator circuitry 62 might further provide a radio signal strength indictor (RSSI) signal which is an analog signal indicating the strength of the received signal. RSSI might be received by an analog-to-digital converter (ADC) 63 which would make a digital signal indicating the received signal strength available at the input 65 of microprocessor 18. The use of this information will be described hereinbelow.

In accordance with the present invention, the interrogator 12 is further operable to measure the strength of a received communication signal, including the effects of coupling efficiency and other filtering of the received signal. One method of doing this is by the RSSI signal discussed above, although many other methods known in the art could be used. Power or amplitude measurements of the incoming signal are both possible ways to measure the effective communication signal strength between responder unit 12 and interrogator unit 10. For example, if the interrogator 10 is in wireless electrical communication with a responder unit 12, then the efficiency of this wireless communication should be maximized when the resonant frequency of the responder's transmitting antenna 133 (not shown, see FIG. 3) is exactly matched to the resonance of the interrogator's receiving antenna 33.

Figures 2A, 2B:
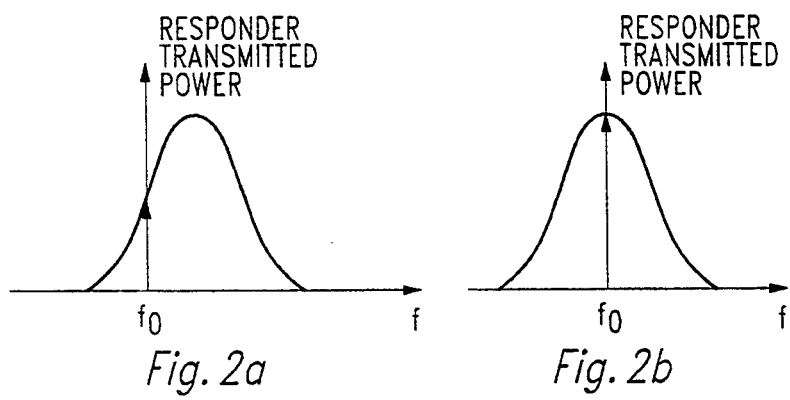
FIGS. 2a–2b are graphs of the responder unit's response transmitted power vs. frequency wherein the desired frequency is denoted as $f_0$.

The importance of this frequency matching is illustrated in FIGS. 2a-b. Notice in FIG. 2a that the peak of transmission power of the responder's transmitting antenna 133 is not aligned with the desired frequency $f_0$. The desired frequency $f_0$ is normally the resonant frequency of the interrogator's receiving antenna 33. This frequency mismatch results in lowered signal coupling between the antennas 33,133. In the example shown, the power spectrum intersects with the desired frequency $f_0$ at approximately 50% of its maximum, resulting in a great loss of range and/or immunity to interference. The radio signal strength indicator (RSSI) signal will be a measurement of the received signal strength as it is coupled between the transmitting and receiving antennas 133,33 through the transmitting medium. As such, it will have a maximum which generally occurs when the transmitting and receiving antennas 133,33 are identically tuned. By using this RSSI signal, as converted by ADC 63, the interrogator unit 10 can tune the responder unit 12 by sending data to the responder unit 12 corresponding to a change or $\Delta$ (delta) in frequency. An example protocol for tuning the responder 12 might be to send $\Delta_l$ and $\Delta_h$ data to the responder unit 12, where $\Delta_l$ has the effect of tuning the resonant circuit 130 of the responder unit 12 to a lower frequency than is effected by $\Delta_h$. The interrogator unit 10 then monitors the RSSI signal via ADC 63 as the responder unit 12 responds using both the $\Delta_l$ and the $\Delta_h$ data to modify its resonant frequency as will be described below. If the RSSI signal is greater using $\Delta_l$ than using $\Delta_h$, then in this sample protocol one would assume that the responder unit is detuned to a higher than desired frequency and that by lowering the resonant frequency by $\Delta_l$ the tuning match between transmitter and receiver has been improved. In this instance, the resonant frequency would continue to be lowered in $\Delta_l$ increments until the RSSI signal ceases to increase incrementally. At this time the protocol might assume that a maximum has been reached and that the responder unit has been properly tuned. Conversely, if the RSSI signal is greater using $\Delta_h$ than using $\Delta_l$, then in this sample protocol one would assume that the responder unit is detuned to a lower than desired frequency and that by increasing the resonant frequency by $\Delta_h$ the tuning match between transmitter and receiver has been improved. In this instance, the resonant frequency would continue to be increased in $\Delta_h$ increments until the RSSI signal ceases to increase incrementally. At this time the protocol might assume that a maximum has been reached and that the responder unit has been properly tuned. Naturally, many other algorithms exist for finding local extrema, for example, adaptive algorithms might not only record the direction of the change in the RSSI signal, but also the magnitude. If the change in magnitude is small then it might be desirable, depending on the characteristic shape of the frequency response, to increase the magnitude of the $\Delta_l$ or $\Delta_h$. Many such algorithms are well known in the art and will be apparent to persons skilled in the art upon reference to the description. It is therefore intended that the appended claims encompass any such modifications or embodiments. Without limiting the scope of the invention, the procedure of programming a responder unit 12 with tuning data will now be described below in reference to a half-duplex communication protocol. Other methods to program a responder unit 12 will be apparent to one of ordinary skill in the art upon review of this specification. It is therefore intended that the appended claims encompass any such modifications or embodiments.

Figure 3:
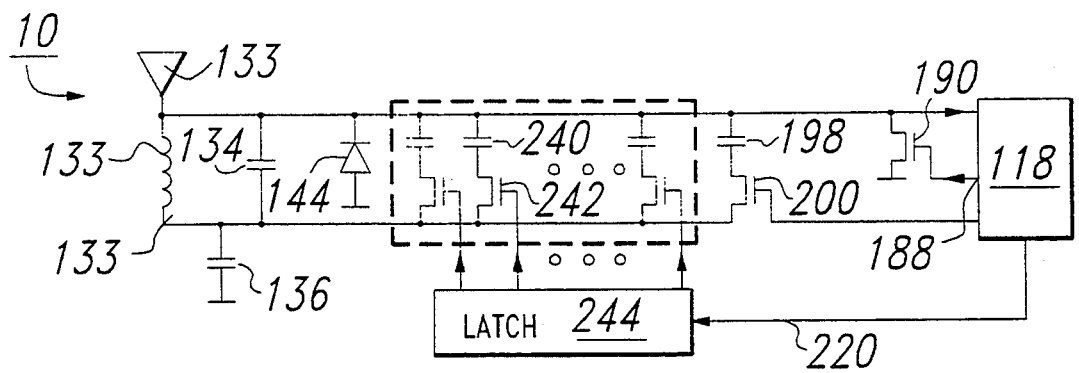
FIG. 3 is a block circuit diagram of the responder unit according to the invention.

The responder unit 12 illustrated in FIG. 3 contains for reception of the RF interrogation pulse a parallel resonant circuit 130 having a coil 132 and a capacitor 134. In addition the parallel resonant circuit 130 is connected to an RF bus 138. An RF carrier occurs at the RF bus 138 whenever the parallel resonant circuit 130 receives an RF interrogation pulse from the interrogator unit 10. Control circuit 118 receives this RF signal and in the preferred embodiment will respond to the RF interrogation pulse after the interrogator unit 10 ceases transmitting. Control circuit 118 responds by furnishing at its output 188 an excitation pulse or pluck signal. Said excitation pulse renders the field-effect transistor 190 conductive which in turn applies the RF bus 138 to ground for the duration of the excitation pulse. This provides a direct current from the storage capacitor 136 through the coil 132 thus providing energy to the resonant circuit and maintaining a carrier wave oscillation in the resonant circuit 130.

Connected to the RF bus 138 is a capacitor 198 which by a field-effect transistor (FET) 200 acting as a switch can be operatively connected to the parallel resonant circuit 130. In this manner data can be modulated upon the carrier wave. Specifically, if the FET 200 is non-conducting or switched "off" then the carrier wave will continue to oscillate at its normal frequency. If, however, the FET 200 is made conductive or switched "on" then the capacitor 198 will be connected in parallel across the resonant circuit thereby providing a new resonant frequency which will be lowered by the added capacitance. In response to data applied to the gate of FET 200 the carrier wave is then frequency modulated.

The control circuit 118 is further operable to demodulate, from the RF carrier wave of the RF programming sequence, data which may be used to change or "tune" the frequency with which the RF carrier wave generator or resonant circuit 130 operates. For changing or tuning the resonant circuit 130 frequency, a programmable tuning network 238 is provided in the preferred embodiment of the present invention. This programmable tuning network 238 operates by switching a network of parallel capacitors 240, each capacitor 240 being connected through a field-effect transistor or FET 242 in parallel with the resonant circuit 130. Each field-effect transistor 242 is connected to a latch 244 which receives and latches data from the control circuit 118 via data bus 220. An EEPROM might replace the latch 244 to store the EEPROM resonance tuning function. The contents of the EEPROM can be changed by the control circuit 118 in response to commands sent by the interrogator unit 10. By switching a field-effect transistor 242 to a conducting "ON" state, its associated capacitor 240 is connected in parallel with parallel resonant circuit 130. This added capacitance will lower the resonant frequency of the parallel resonant circuit 130. By switching a field-effect transistor 242 to a non-conducting "OFF" state, its associated capacitor 240 is floating and has no effect on the parallel resonant circuit 130. A network 238 of FET/capacitor pairs 240,242 can provide many different values of added capacitances depending on the combinations of each capacitor's 240 relative value as is well known in the art. Alternatively, latch 244 could be a one-time-programmable (OTP) memory such that the data is fixedly stored therein and the device may be permanently programmed to set the value of programmable tuning network 238.

Figure 4:
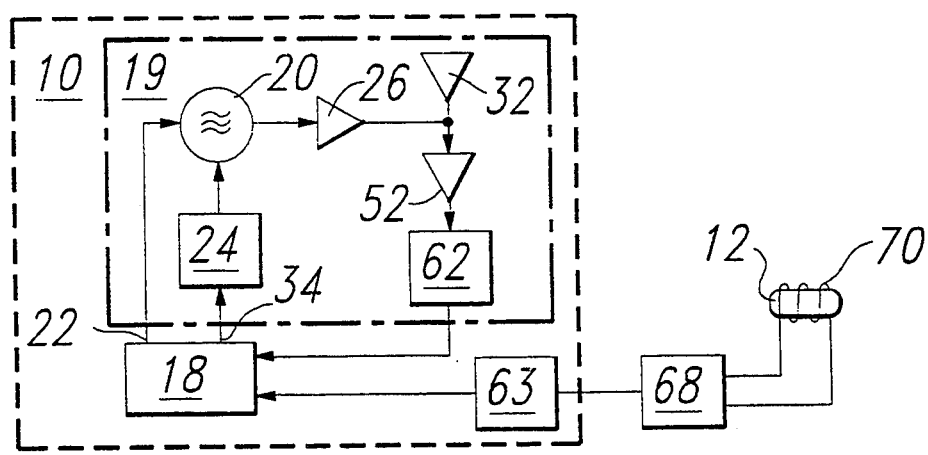
FIG. 4 is a block diagram of an alternative system block diagram using a loosely coupled pick-up coil to detect the responder unit's response transmitted power.

For the embodiment described above the responder unit 12 must be in a fixed position relative to the interrogator unit 10 in order to have predictably reliable field strengths to use as the tuning criteria. The alternative embodiment shown in FIG. 4 does not carry this requirement. This alternative embodiment comprises a coil 70 loosely coupled to the responder unit 12. This coil 70 preferably is coiled about responder unit 12 to detect the RF responses given by the responder unit 12. The coil connects to the signal amplitude detector 68 which decodes the signal amplitude or field strength of the RF responses and communicates the result as a "Return Signal" to the ADC 63 which again would make a digital signal indicating the received signal strength available for microprocessor 18.

Figure 5A:
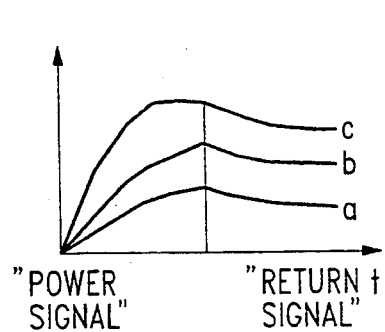
FIGS. 5a–5b are graphs illustrating the coupling of power between the responder unit and interrogator unit for progressively closer matched responder unit tuned frequencies.
Figure 5B:
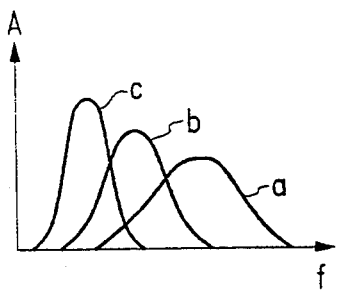

With reference now to FIGS. 5a–5b, graphs are shown for several different frequencies (a, b, and c) to which the responder unit 12 is tuned. FIG. 5a shows the "Power Signal" and the "Return Signal" as they vary with time for instances in which the antenna is tuned to one of the three frequencies (a, b, or c). The corresponding graph of FIG. 5b gives a frequency spectrum of the coupling between the interrogator unit 10 to the responder unit 12 for the three frequencies as seen by the pick-up coil 70. Each progressively lower frequency is more closely matched to the resonant frequency of the interrogator unit 10 causing a much higher and narrower frequency response as shown in FIG. 5b. As a way to determine the coupling strength between the interrogator and responder unit 10,12 the interrogator unit 10 can measure the time in which it takes for the "Power Signal" as measured by the pick-up coil to reach a given level. The more quickly the "Power Signal" reaches this given level, the more highly tuned the responder unit 10 is to the interrogator unit 10.

Yet another method for retuning or initializing the responder unit after normal RF-ID interrogation cycles is to measure the strength of RF responses to consecutive reading cycles. In this case two or more interrogations can be executed where the interrogator unit 10 asks the responder unit 12 to respond with a lower and a higher tuning capacitor trimming value. The interrogator unit 10 then analyzes the response/field strength and continues retuning or confirms the previous status.

A few preferred embodiments have been described in detail hereinabove. It is to be understood that the scope of the invention also comprehends embodiments different from those described, yet within the scope of the claims.

"Microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as non-exhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For instance, in systems using a full duplex or simultaneous power/receive protocol, the signal amplitude information can be derived from the modulated sidebands which are created by the responder from the carrier emitted. It is therefore intended that the appended claims encompass any such modifications or embodiments.

What is claimed is:

1. A method of communicating between an interrogator unit having a first resonant circuit and a responder unit having a second resonant circuit, said method comprising the steps of:
    a) storing energy in a responder unit energy accumulator in a contactless fashion by RF energy transmitted from said interrogator unit to said responder unit;
    b) exciting within the resonant circuit of said responder unit an RF carrier wave;
    c) measuring the signal strength of said RF carrier wave; and
    d) adjusting the resonant frequency of one of said resonant circuits responsive to said signal strength measurement.

2. The method of claim 1 wherein said signal strength of said RF carrier wave is measured by a pick-up coil which is loosely coupled to said second resonant circuit of said responder unit.

3. The method of claim 1 and further comprising the step of transmitting said RF carrier wave in a first response from said responder unit to said interrogator unit.

4. The method of claim 3 and further comprising step of measuring within said interrogator unit the received signal strength of said first response.

5. The method of claim 4 wherein the step of adjusting the resonant frequency of said one of said resonant circuits responsive to said signal strength measurement is by transmitting at least one RF programming sequence from said interrogator unit to said responder unit.

6. The method of claim 5 and further comprising the step of receiving at said responder unit a first set of data transmitted by said RF programming sequence from said interrogator unit.

7. The method of claim 6 and further comprising the step of modifying an internally stored frequency setting within said responder unit in response to said first set of data.

8. The method of claim 7 wherein said RF carrier wave is generated by a parallel LC oscillator having at least one parallel inductor and at least one parallel capacitor.

9. The method of claim 8 and further comprising the step of modifying the frequency of said RF carrier wave in accordance with said internally stored frequency setting by selectively changing the capacitance of said LC oscillator.

10. The method of claim 9 wherein said RF carrier wave is generated by a parallel LC oscillator having said at least one parallel inductor and at least two parallel capacitors.

11. The method of claim 9 wherein said capacitance of said LC oscillator is selectively changed by selectively connecting and disconnecting one of said at least two parallel capacitors by a switch.

12. The method of claim 9 and further comprising the step of storing the received signal strength subsequent to said measuring step.

13. The method of claim 12 and further comprising the step of sending a second set of data transmitted by another RF programming sequence from said interrogator unit.

14. The method of claim 13 and further comprising the step of modifying the frequency of said RF carrier wave in accordance with said second set of data by selectively changing the capacitance of said LC oscillator.

15. The method of claim 14 and further comprising the step of transmitting said RF carrier wave in a second response from said responder unit to said interrogator unit.

16. The method of claim 15 and further comprising the step of measuring within said interrogator unit the received signal strength of said RF carrier wave of said second response.

17. The method of claim 16 and further comprising the step of comparing said stored received signal strength with said measured signal strength of said second response.

18. A method of communicating between an interrogator unit having a first resonant circuit and a responder unit having a second resonant circuit, said method comprising the steps of:
    a) storing energy in a responder unit energy accumulator in a contactless fashion by RF energy transmitted from said interrogator unit to said responder unit;
    b) exciting within said responder unit an RF carrier wave;
    c) transmitting said RF carrier wave in a first response from said responder unit to said interrogator unit;
    d) measuring within said interrogator unit the signal strength of said first response;
    e) transmitting at least one RF programming sequence from said interrogator unit to said responder unit;
    f) receiving at said responder unit a first set of data transmitted by said RF programming sequence from said interrogator unit; and
    g) adjusting the resonant frequency of said responder unit resonant circuit responsive to said first set of data.

19. A method of communicating between an interrogator unit having a first resonant circuit and a responder unit having a second resonant circuit, said method comprising the steps of:
    a) storing energy in a responder unit energy accumulator in a contactless fashion by RF energy transmitted from said interrogator unit to said responder unit;
    b) exciting within said responder unit an RF carrier wave;

c) transmitting said RF carrier wave in a first response from said responder unit to said interrogator unit;
d) measuring within said interrogator unit the signal strength of said first response;
e) storing said measurement of said first response signal strength;
f) transmitting a RF programming sequence from said interrogator unit to said responder unit;
g) receiving at said responder unit a first set of data transmitted by said RF programming sequence from said interrogator unit;
h) adjusting the resonant frequency of said responder unit resonant circuit responsive to said first set of data;
i) transmitting said RF carrier wave in a second response from said responder unit to said interrogator unit;
j) measuring within said interrogator unit the signal strength of said second response; and
k) comparing said stored first response measurement to said second response measurement.

20. Transponder arrangement comprising:
a) an interrogator unit which transmits at least one RF programming sequence containing tuning data followed by at least one RF interrogation pulse, said interrogator unit comprising
   i) a transmitter which transmits said RF interrogation pulse and said RF programming sequence,
   ii) a receiver for receiving a wireless response from a responder unit,
   iii) a detection circuit for detecting the strength of a carrier wave generated by said responder unit, and
   iv) a control circuit for analyzing the detected strength of said carrier wave and for determining if a new set of tuning data for another RF programming sequence needs to be computed; and
b) a responder unit which upon receipt of said RF interrogation pulse transmits read data stored therein back to the interrogator unit in the form of said wireless response, said responder unit comprising
   i) a responder unit reception circuit for receiving said tuning data transmitted by said RF programming sequence from said interrogator unit,
   ii) a memory suitable for having memory data therein modified by said tuning data received by said reception circuit,
   iii) a responder unit energy accumulator which stores energy contained in the RF interrogation pulse,
   iv) a responder unit RF carrier wave generator having a resonant frequency, and
   v) a tuning circuit which modifies the resonant frequency of said RF carrier wave generator in accordance with said memory data.

* * * * *